United States Patent [19]

Wehner et al.

[11] Patent Number: 5,868,023
[45] Date of Patent: Feb. 9, 1999

[54] PROCESS FOR MANUFACTURING HOLLOW BODIES

[75] Inventors: Frank Wehner, Steisslingen; Gerd Springe, Wangen, both of Germany

[73] Assignee: Alusuisse Technology & Management Ltd., Switzerland

[21] Appl. No.: 926,373

[22] Filed: Sep. 9, 1997

[30] Foreign Application Priority Data

Sep. 25, 1996 [EP] European Pat. Off. .............. 96810628

[51] Int. Cl.⁶ .................................................. B21D 26/02
[52] U.S. Cl. ....................................... 72/60; 72/62; 72/56
[58] Field of Search .................................. 72/54, 56, 62, 72/60

[56] References Cited

U.S. PATENT DOCUMENTS

| | | |
|---|---|---|
| 4,269,053 | 5/1981 | Agrawal et al. . |
| 5,058,408 | 10/1991 | Leftault, Jr. et al. ........................ 72/56 |
| 5,214,948 | 6/1993 | Sanders et al. .............................. 72/62 |
| 5,671,629 | 9/1997 | Valyi ........................................... 72/62 |
| 5,687,599 | 11/1997 | Donaldson et al. ......................... 72/62 |

FOREIGN PATENT DOCUMENTS

| | | |
|---|---|---|
| 0548859 | 6/1993 | European Pat. Off. . |
| 1959999 | 7/1970 | Germany . |
| 4157141 | 5/1992 | Japan . |
| 4167931 | 6/1992 | Japan . |
| 4187325 | 7/1992 | Japan . |
| 8197152 | 8/1996 | Japan . |

OTHER PUBLICATIONS

Metals handbook, 8th edition, vol. 1, Properties and Selection of Metals, Feb. 1966, p. 865.

Patent Abstracts of Japan, vol. 016, No. 507 (M–1327), Oct. 20, 1992.

Patent Abstracts of Japan, vol. 016, No. 449 (C–0986), Sep. 18, 1992.

Patent Abstracts of Japan, vol. 016, No. 467 (M–1317), Sep. 29, 1992.

*Primary Examiner*—David Jones
*Attorney, Agent, or Firm*—Bachman & LaPointe, P.C.

[57] ABSTRACT

Hollow bodies such as construction elements for vehicle manufacture can be produced by forming a preform in the form of a longitudinal body or sheets of aluminum or its alloys by means of a high internal pressure process or by superplastic forming in a tool. In this process the preform is heat treated locally before forming, on places of high elongation during the forming process and/or the tool for the forming process is equipped with local surface characteristics of different friction such as roughness patterns or with smoothed surfaces.

12 Claims, No Drawings

PROCESS FOR MANUFACTURING HOLLOW BODIES

BACKGROUND OF THE INVENTION

The present invention relates to a process for manufacturing hollow bodies by shaping a preform, which is in the form of a hollow longitudinal body or sheets of aluminum or its alloys, by means of a high internal pressure process or superplastic forming in a tool, the use of the hollow body and the preform for performing the process.

It is known to shape-form sheets of metal by superplastic forming. In order to counter different degrees of elongation of the material during forming, it has been proposed in Swiss Patent 673 603 to cool the sheet locally during the forming operation.

In U.S. Pat. No. 4,269,053 a process for superplastically forming parts is described in which a preform is pressed against a shape-endowing part. The shape-endowing part exhibits various coefficients of friction. Accordingly, the material of the preform can expand more easily and a more uniform distribution of thickness is obtained in the final part.

A prerequisite for these processes is for example that the tools have to be equipped with inlets for cooling medium or, a third material has to be introduced into the tool as an intermediate layer.

In the process of superplastic forming, the sheet to be formed is clamped in a chamber and heated to the forming temperature. For aluminum alloys this lies between approx. 450° and 550° C. The forming of the sheet takes place by means of compressed air in a counterforming tool in the chamber. The unavoidably different local elongation of the material that arises during shape-forming leads to smaller cross-sectional thicknesses in the regions that are elongated to a greater degree. This localized necking of the material has the result of preferred concentration of the further elongation of material in these regions.

In the case of high internal pressure forming a preform is introduced into a divided tool which is then closed and two compression side pieces with pushing rods advanced. After the tubular shaped piece has been filled with the pressure medium and the signal given to the high pressure source, the actual forming process is started. The high internal pressure which the pressure medium applies to the preform, in some cases in combination with the superimposed axial pressure, causes the preform to take on the precisely the contour of the tool. It is also possible to feed limited amounts of material by applying axial compression during the spreading out stage.

SUMMARY OF THE INVENTION

In view of the above, the object of the present invention is to provide a process of the kind discussed above which counters the tendency for local differences in elongation of material and in that process to enable a higher maximum degree of formability and control of thickness via the elongation to be achieved.

That object is achieved by way of the invention in that the preform is annealed locally before the forming process and at places of high elongation during the forming process, and/or the tool is provided with local characteristics of different degrees of friction.

DETAILED DESCRIPTION OF PREFERRED EMBODIMENTS

The preform may be a sheet that is shaped in the tool. The preform may be a longitudinal body such as e.g. a pipe of round, oval or polygonal cross-section. The longitudinal body may feature one or more e.g. two, three, four etc. longitudinal hollow chambers. In keeping with the contours of the final hollow body, the pipe may already feature indents or projections such as e.g. dish-shaped recesses or projections.

Instead of a pipe, the starting material may be in the form of two equal or similarly sized sheets, which as the case requires may be welded together at the edges, and the pressure medium may be pressed between the sheets e.g. by means of a cleaving chisel and the sheets widened. The sheets or pipes may already exhibit local accumulation or thinning of material.

According to the present invention the preforms of cold work hardened or age-hardenable aluminum alloys are usefully exposed locally to an annealing process.

The term used in connection with the preforms refers to versions of technical to pure grades of and in particular also to aluminium alloys. Preferred aluminium alloys are mentioned below.

Useful are preforms according to the present invention made from an aluminum belonging to the thermally hardenable type of aluminum alloys, or from the AlMg alloys. Preferred are preforms made from the thermally hardenable aluminum alloys of the AlMgSi or ALZnMg type, preferably the $AlZn_{4.5}Mg_1$ or an AlMg alloy, preferably $AlMg_3$ or $AlMg_{4.5}Mn$ or cold work hardened or age hardenable alloys of the AlCuMg, AlCuSMn, AlMnSi, AlZnMg or AlZnMgCu type.

In the process according to the invention the preforms of aluminum are prepared and then exposed locally i.e. in at least one locally delimited region, to elevated temperatures of 250° to 450° C. for 1 to 300 seconds.

In its rough form, the preform may e.g. be an extruded section, an extrusion molded part or a forging. Sheets are as a rule rolled products.

The locally delimited region or regions on the preform are heat treated according to the process of the invention. The region or regions may be distributed uniformly or non-uniformly over the preform according to the pattern of intended deformation. By the term locally delimited region one may understand e.g. regions referred to the surface area e.g. of the order of 5–500 cm$^2$, preferably 5–50 cm$^2$.

The heat treatment may be performed by inductive or convective heating or by thermal radiation. Inductive heating may be performed by exposing the region in question to the influence of an induction coil. Convective heating may be performed by exposing the regions to be treated to a stream of heating medium such as e.g. heated gases such as air or combustion gases and the thermal radiation may be provided by an infra red gas burner or by electrical means. An important feature of the process is that the heat treatment is limited to the regions and the whole preform is not heated by thermal conduction.

The heat treatment i.e. the local heat treatment, in particular of cold work hardened or hardenable alloys, enables the flow of preform material to be controlled locally. The elongation of material, for example, is increased to such an extent that the required flow behavior is fully achieved.

If the forming operation is performed using a tool which features local surface characteristics of higher friction, the characteristic of higher friction may be in the form of a pattern of roughness on the part of the tool surface effecting the forming. The roughness pattern may be situated especially on those regions of the preform where a low rate of forming is desired. The roughness patterns may e.g. be a roughening of parts of the tool surface or an insert situated in a recess in the tool. The insert may be of another material than that of the tool. For example, the pairs of material may be metal/metal, metal/ceramic or ceramic/ceramic. The roughness pattern may be achieved e.g. by partial removal of material by chemical or physical means such as etching, sandblasting, spark erosion, engraving etc.,, or by local deposition of a coating on regions of the tool.

A localized roughness pattern may be provided by means of various materials on the surface of the tool viz., in those regions effecting the forming e.g. metal surfaces and ceramic surfaces. Such local areas of ceramic may be e.g. of silicon carbide or corundum. By locally increasing the roughness of the preform at the tool wall it is possible to hinder flow there. As a result, other regions that otherwise would flow only in a retarded manner, e.g. because of greater wall thickness, can then be made to flow preferentially.

In another version the preform may be formed by a tool with local surface characteristics of low friction in the form of smoothed surface areas or surface areas of metal or ceramic such as chromium or boron nitride. Local flow of the preform can be promoted at the smoothed surface regions of the tool.

The smoothing of the surfaces, in particular tool surfaces of metal may be effected e.g. by polishing or by coating with a smoothing material.

Of course it is possible to have a tool characterized by local regions that exhibit high friction and other local regions exhibiting low friction. The process according to the invention may e.g. be carried out in such a manner that the preform is shaped using a tool exhibiting in regions of high elongation surface characteristics of high friction in the form of a roughness pattern, and in regions of low elongation local surface characteristics of low friction in the form of smoothed parts of the surface.

likewise, the processes of annealing the preform and the use of a tool with different local characteristics may be combined.

The preforms may be processed into hollow bodies using the process according to the invention. The hollow bodies may be processed further or used directly. The hollow bodies that in some cases are processed further find application e.g. as construction elements in vehicle manufacture. Examples of construction elements are parts of the chassis and the body of automobiles, such as hang-on parts, axles, axle necks, wheel alignment elements, longitudinal and transverse members, transverse, inclined or longitudinal levers, auxiliary frames or parts thereof, door frame parts, bonnets/hoods and lids, body-frame parts, parts of the armature support, supports for auxiliary equipment, parts for securing seats, safety parts in and on the vehicle body, collision protectors e.g. in the doors and in the front and rear regions of the vehicle etc.

We claim:

1. Process for manufacturing hollow bodies or sheets for construction elements for vehicles, which comprises:

providing a preform of a material selected from the group consisting of aluminum and aluminum alloys in the form of one of a hollow longitudinal body and sheets; shaping said preform in a tool by means of one of high internal pressure and superplastic forming; wherein said shaping step includes at least one of (1) annealing said preform locally before the shaping step at places of high elongation during the shaping step, and (2) providing said tool for the shaping step with local characteristics of different degrees of friction; thereby providing construction elements for vehicles.

2. Process according to claim 1, wherein said preform is shaped from a cold worked aluminum alloy.

3. Process according to claim 1, wherein said preform is shaped from an age-hardenable aluminum alloy.

4. Process according to claim 1, wherein said preform is at least one of (1) a cold worked aluminum alloy, and (2) an age-hardenable aluminum alloy.

5. Process according to claim 1, wherein said tool for shaping the preform exhibits local surface characteristics of high friction in the form of a roughness pattern in region of higher elongation.

6. Process according to claim 1, wherein said tool for shaping the preform exhibits local surface characteristics of low friction in the form of smoothed surface parts in a region of low elongation.

7. Process according to claim 1, wherein said tool for shaping the preform exhibits local surface characteristics of high friction in the form of a roughness pattern in a region of higher elongation and exhibits local surface characteristics of low friction in the form of smoothed surface parts in a region of low elongation.

8. Process according to claim 1, wherein the preform is of aluminum alloys selected from the group consisting of AlMg, AlCuMg, AlCu SiMn, AlMgSi, AlZnMg and AlZnMgCu.

9. Process according to claim 1, wherein the resultant product is in the form of construction elements for automobiles.

10. Process according to claim 1, wherein said preform is exposed locally to elevated temperatures of 250° C. to 450° C. for an interval of 1 second to 300 seconds.

11. Process according to claim 1, wherein said shaping step includes shaping by fluid pressure.

12. Shaped article manufactured in accordance with the process of claim 1.

* * * * *